US012764834B2

(12) United States Patent
Kim et al.

(10) Patent No.: US 12,764,834 B2
(45) Date of Patent: Oct. 13, 2026

(54) METHOD AND APPARATUS TO SUPPORT FEDERATION OF EDGE COMPUTING SERVICES

(71) Applicant: Samsung Electronics Co., Ltd., Gyeonggi-do (KR)

(72) Inventors: Hyesung Kim, Gyeonggi-do (KR); Sungjin Park, Gyeonggi-do (KR); Cheolung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 208 days.

(21) Appl. No.: 18/336,374

(22) Filed: Jun. 16, 2023

(65) Prior Publication Data

US 2023/0412698 A1 Dec. 21, 2023

(30) Foreign Application Priority Data

Jun. 16, 2022 (KR) ........................ 10-2022-0073614

(51) Int. Cl.
*H04W 88/18* (2009.01)

(52) U.S. Cl.
CPC .................................. *H04W 88/18* (2013.01)

(58) Field of Classification Search
CPC ......... H04W 88/18; H04W 4/50; H04W 4/02; H04W 76/10; H04L 67/141; H04L 67/51; H04L 67/567; H04L 41/0803; H04L 67/53
See application file for complete search history.

(56) References Cited

U.S. PATENT DOCUMENTS

| | | | |
|---|---|---|---|
| 2020/0221541 A1 | 7/2020 | Yan | |
| 2020/0283125 A1 | 9/2020 | Dong et al. | |
| 2021/0112137 A1* | 4/2021 | Soloway | H04L 67/568 |
| 2021/0136775 A1* | 5/2021 | Soloway | G06F 9/5044 |
| 2022/0086218 A1* | 3/2022 | Sabella | H04M 15/66 |
| 2022/0150696 A1* | 5/2022 | Rajadurai | H04W 12/041 |
| 2023/0132454 A1 | 5/2023 | Kim et al. | |
| 2024/0056497 A1* | 2/2024 | Nooren | H04L 67/52 |

(Continued)

FOREIGN PATENT DOCUMENTS

| | | |
|---|---|---|
| KR | 10-2023-0061128 | 5/2023 |
| WO | WO 2021/202966 | 10/2021 |
| WO | WO 2021/261953 | 12/2021 |

OTHER PUBLICATIONS

3GPP TR 23.700-98 V1.0.0, 3rd Generation Partnership Project; Technical Specification Group Services and System Aspects; Study on Enhanced Architecture for Enabling Edge Applications; (Release 18), Jun. 2022, 142 pages.

(Continued)

*Primary Examiner* — Dhaval V Patel
(74) *Attorney, Agent, or Firm* — The Farrell Law Firm, P.C.

(57) ABSTRACT

Disclosed is a method performed by an edge configuration server (ECS) associated with a first edge computing service provider in an edge computing system, including transmitting, to a partner ECS associated with a second edge computing service provider, a request message for requesting information associated with an edge data network (EDN), and receiving, from the partner ECS, a response message including the information associated with the EDN, wherein the EDN is identified based on the request message.

11 Claims, 6 Drawing Sheets

(56) References Cited

U.S. PATENT DOCUMENTS

2025/0047737 A1 * 2/2025 Gupta ..................... H04L 67/51

OTHER PUBLICATIONS

International Search Report dated Sep. 14, 2023 issued in counterpart application No. PCT/KR2023/008348, 7 pages.
Qualcomm, "Pseudo-CR on Enhanced ECS for Federation and Roaming", S6-221379, 3GPP TSG-SA WG6 Meeting #49-e, May 16-25, 2022, 10 pages.
3GPP TS 23.558 V2.1.0, (Apr. 2021), pp. 152.
European Search Report dated Jun. 13, 2025 issued in counterpart application No. 23824278.8-1218, 11 pages.
3GPP TR 23.700-98 V1.0.1, (Jun. 2022), pp. 142.
EP Communication Report dated Aug. 21, 2026 issued in counterpart application No. 23824278.8-1218, 8 pages.

* cited by examiner

METHOD AND APPARATUS TO SUPPORT FEDERATION OF EDGE COMPUTING SERVICES

CROSS-REFERENCE TO RELATED APPLICATION(S)

This application is based on and claims priority under 35 U.S.C. § 119 to Korean Patent Application No. 10-2022-0073614, filed on Jun. 16, 2022, in the Korean Intellectual Property Office, the disclosure of which is incorporated herein by reference in its entirety.

BACKGROUND

1. Field

The disclosure relates generally to a wireless communication system, and more particularly, to a method for supporting an edge computing service in cooperation between operators or edge computing service providers in a wireless communication system.

2. Description of Related Art

The 5th generation (5G) mobile communication technologies define broad frequency bands enabling high transmission rates and new services, and can be implemented not only in sub 6 gigahertz (GHz) bands such as 3.5 GHz, but also in above 6 GHz bands referred to as millimeter wave (mmWave) including 28 GHz and 39 GHz. It has also been considered to implement 6th generation (6G) mobile communication technologies, referred to as beyond 5G systems, in terahertz (THz) bands such as 95 GHz to 3 THz bands to achieve transmission rates fifty times faster than 5G mobile communication technologies and ultra-low latencies one-tenth of 5G mobile communication technologies.

At the outset of 5G technology development, to support services and satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access channel (RACH) procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

An edge computing system for supporting edge node sharing (i.e., edge federation) may support access to an edge application server (EAS) hosted in an edge hosting environment (EHE) of another operator. The EHE of another operator may be located in an edge data network (EDN) different from an EDN to which a protocol data unit (PDU) session is conventionally connected. That is, there is need in the art for access to an EDN having a different data network name (DNN)/single network slice selection assistance information (S-NSSAI), and a for improvement to a UE route selection policy (URSP) or the DNN/S-NSSAI value of a UE local configuration configured conventionally in a UE (according to a home PLMN configuration).

SUMMARY

The disclosure has been made to address at least the above-mentioned problems and/or disadvantages and to provide at least the advantages described below.

Accordingly, an aspect of the disclosure is to provide a method for supporting an edge computing service by accessing an edge hosting environment of another operator instead of a network operator in which a UE is registered, in order to support edge computing service cooperation (edge federation or edge node sharing).

Another aspect of the disclosure is to provide a method for determining whether edge computing service cooperation is necessary in an edge computing system.

Another aspect of the disclosure is to provide a method for acquiring configuration information in a partner edge computing system.

Another aspect of the disclosure is to provide a method for modifying a configuration in a UE so that a PDU session of the UE may be generated according to partner edge computing configuration information.

Accordingly, an aspect of the disclosure is to provide a method and apparatus by which an edge computing service available area for a UE may be extended, the cost of investing in a hosting environment and infrastructure for providing edge computing services may be decreased, and configuration information and policies related to PDU session generation in a UE may be updated to access an edge computing hosting environment of a partner operator.

In accordance with an aspect of the disclosure, a method performed by an edge configuration server (ECS) associated with a first edge computing service provider in an edge computing system includes transmitting, to a partner ECS associated with a second edge computing service provider, a request message for requesting information associated with an edge data network (EDN), and receiving, from the partner ECS, a response message including the information associated with the EDN, wherein the EDN is identified based on the request message.

In accordance with an aspect of the disclosure, a method performed by a partner ECS associated with a first edge computing service provider in an edge computing system includes receiving, from an ECS associated with a second edge computing service provider, a request message for requesting information associated with an EDN, identifying the EDN to provide an edge computing service based on the request message, and transmitting, to the ECS, a response message including the information associated with the EDN.

In accordance with an aspect of the disclosure, an ECS associated with a first edge computing service provider in an edge computing system includes a transceiver, and a controller coupled with the transceiver and configured to transmit, to a partner ECS associated with a second edge computing service provider, a request message for requesting information associated with an EDN, and receive, from the partner ECS, a response message including the information associated with the EDN, wherein the EDN is identified based on the request message.

In accordance with an aspect of the disclosure, a partner ECS associated with a first edge computing service provider in an edge computing system includes a transceiver, and a controller coupled with the transceiver and configured to receive, from an ECS associated with a second edge computing service provider, a request message for requesting information associated with an EDN, identify the EDN to provide an edge computing service based on the request message, and transmit, to the ECS, a response message including the information associated with the EDN.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Embodiments of the disclosure will be described in detail with reference to the accompanying drawings. The terms which will be described below are terms defined in consideration of the functions in the disclosure, and may be different according to users, intentions of operators, or customs. Therefore, the definitions of the terms should be made based on the contents throughout the disclosure. Descriptions of well-known functions and constructions are omitted for the sake of clarity and conciseness.

As used herein, terms referring to network entities and objects of an edge computing system, messages, and identification information are illustratively used for the sake of descriptive convenience. Therefore, the disclosure is not limited by the terms as used below, and other terms referring to subjects having equivalent technical meanings may be used.

In the figures described herein, the order of the description does not always correspond to the order in which steps of each method are performed, and the order relationship between the steps may be changed or the steps may be performed in parallel. Alternatively, some elements may be omitted and only some elements may be included therein without departing from the essence and scope of the disclosure.

Herein, terms and names defined in the 5G system standards will be used for the sake of convenience, but the disclosure is not limited by these terms and names and may be applied in the same manner to systems that conform to other standards.

Figure 1:
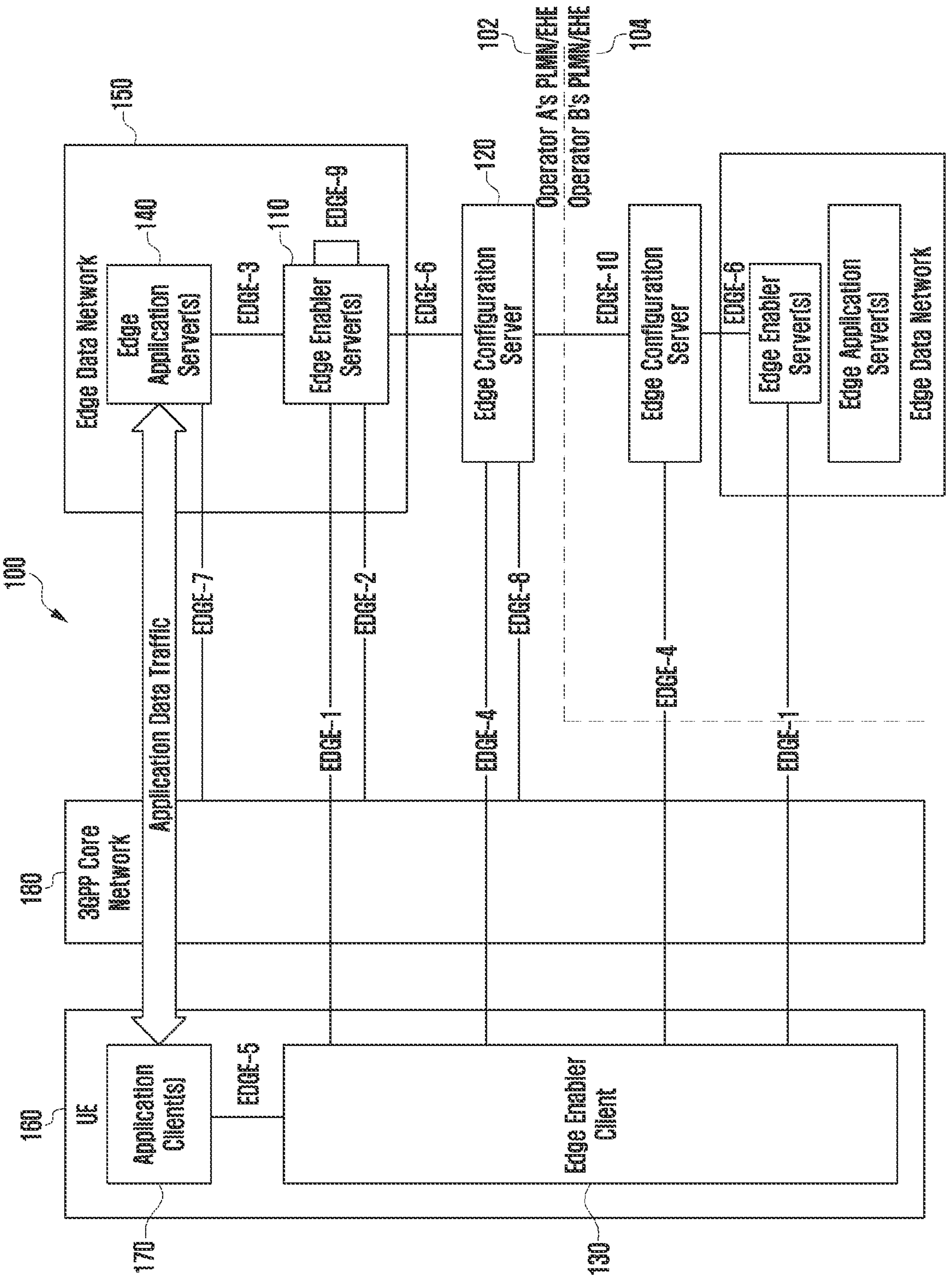
FIG. 1 illustrates an example of an edge computing system structure for supporting federation or edge node sharing according to an embodiment.

FIG. 1 illustrates an example of an edge computing system structure 100 for supporting federation or edge node sharing according to an embodiment.

A description of the network and edge computing entities shown in FIG. 1 is as follows: The edge computing system may include an edge enabler server (EES) 110, an edge configuration server (ECS) 120, and an edge enabler client (EEC) 130. The EES is constructing an edge hosting environment (or edge computing platform) and knows information about an edge application server (EAS) 140 running in the edge hosting environment (i.e., the edge data network 150).

The EES 110 may perform a function of negotiating with a UE 160 to connect an application client (AC) 170 of the UE 160 and the EAS 140 in the edge hosting environment. The EEC 130 may be embedded in a UE 160 supporting the edge computing system. A layer in which interworking between the edge enabler and the EEC 130 is performed may be referred to as an edge enabling layer. In the disclosure, the UE 160 in which EEC 130 is embedded to configure an edge enabling layer may include not only a smartphone but also an IoT device and a vehicle.

The ECS 120 knows deployment information about the EESs 110, and may perform a function of transferring configuration information (edge data network configuration information) for using an edge computing service to the UE 160. The configuration information may include edge data network connection information (e.g., data network name, S-NSSAI, etc.), an edge data network service area (e.g., cell list, list of tracking area, PLMN ID), and EES 110 connection information such as a uniform resource identifier (URI). The edge data network service area may be an EES 110 available area configured by the EES 110. Based on this, the UE 160 may receive EES 110 information accessible from a specific location. In case that the ECS 120 is able to know information about the EAS 140 running in the edge hosting environment of a specific EES 110, the UE 160 may also obtain the corresponding information through the EEC 130. In addition, the ECS 120 may exchange configuration information for using edge computing service with other ECS 120.

The EAS 140 may refer to a third party application server running in the edge computing system. The EAS 140 is running on the infrastructure provided by the edge hosting environment, and thus the EAS 140 may provide a ultra-low latency service at a location close to the UE 160.

The UE 160 may include an AC 170, an EEC 130 performing interworking between the AC and edge computing service, and a mobile terminal (MT) that accesses the mobile communication system. The application of the UE 160 is an application provided by a third party, and may imply a client application program running in the UE 160 for a specific application service. Several applications may be run in the UE 160. At least one of these applications may use an MEC service. The EEC 130 in the UE 160 may perform an operation in the UE 160, required to use the edge computing service. The EEC 130 may determine an application capable of using the edge computing service, and may perform an operation of connecting a network interface so that data of the AC 170 of the UE 160 may be transferred to the EAS 140 that provides the edge computing service. An operation of establishing a data connection to use the edge computing service may be performed in a third generation partnership project (3GPP) communication layer through the mobile terminal. The 3GPP communication layer performs a modem operation to use a mobile communication system, and may establish a wireless connection for data communication, register a UE 160 in the mobile communication system, establish a connection to transmit data to the mobile communication system, and perform a role of transmitting or receiving data.

In the federation (or edge node sharing) scenario described herein, a UE 160 is registered in a core network 180 of a network operator A 102, and is enabled to access, through a PDU session generated through the core network 180 of the operator A, edge computing service providing servers (in an edge hosting environment of operator B 104) supported by a partner network operator B 104.

Figure 2:
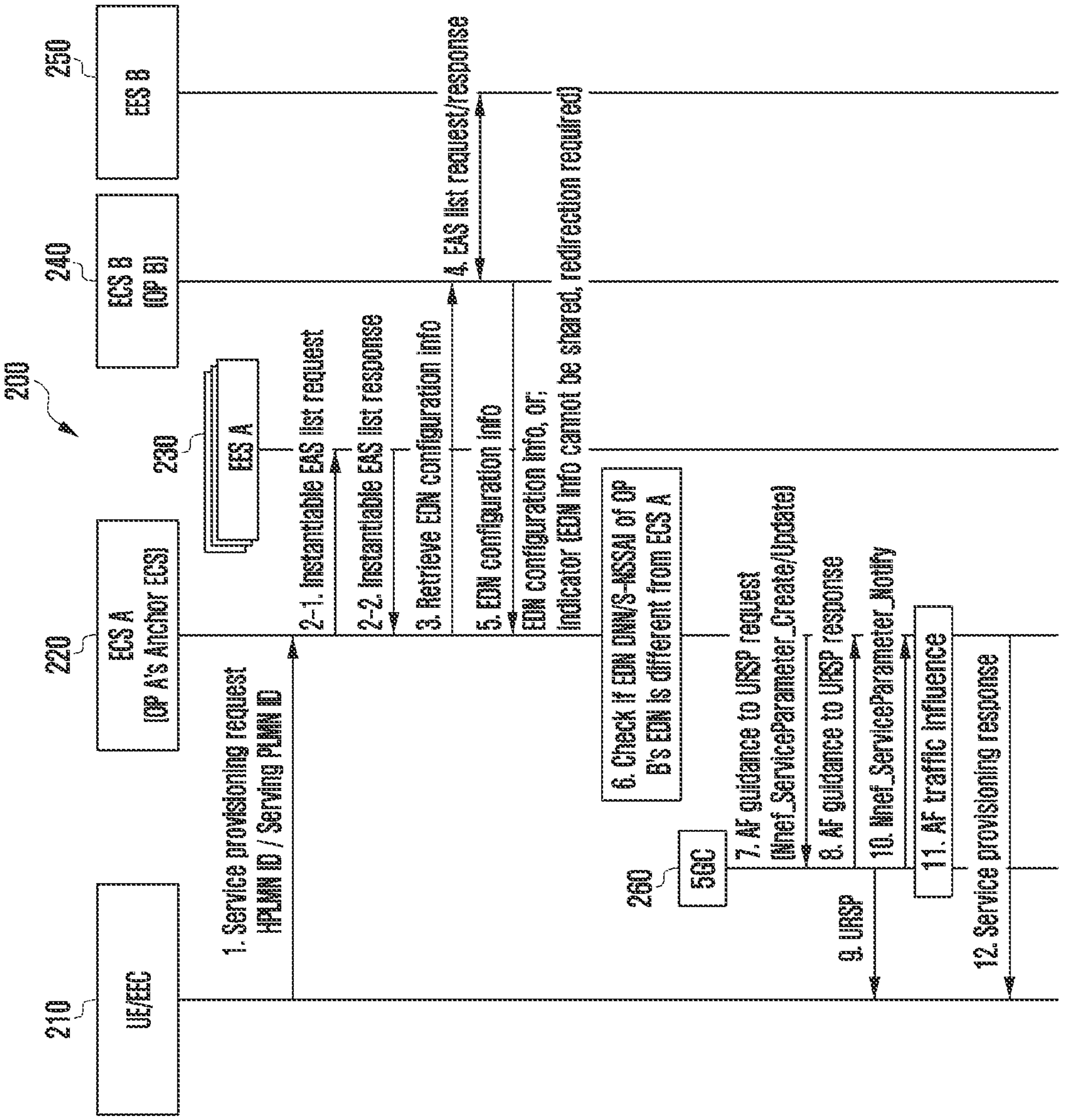
FIG. 2 illustrates an example of a signaling flow for providing edge data network configuration information through federation according to an embodiment.

FIG. 2 illustrates an example of a signaling flow 200 for providing edge data network configuration information through federation according to an embodiment.

In step 1, a UE/EEC 210 may transmit a service provisioning request message to an ECS A 220. For example, the ECS A 220 may be an anchor ECS of a network operator A. The corresponding message may include at least one of a UE identifier, an EEC identifier, UE location information, a home public land mobile network (HPLMN) ID, a serving PLMN ID, and AC information (e.g., an AC identifier, an EAS identifier, EAS fully qualified domain name (FQDN), etc.).

The ECS A 220 may then determine whether to perform federation by considering the UE identifier, AC information, and the like included in the received service provisioning request message.

The ECS A 220 may determine to perform federation in case that there is no EAS which is running or is capable of performing instantiation in an edge hosting environment of a PLMN network operator accessed by a UE 210 or an edge computing service provider contracted directly with the PLMN network operator. Specifically, the ECS A 220 may identify information on the currently running EAS by comparing an EAS ID list in an EES profile provided from the EES(s) accessible from the current location of the UE 210 with the AC information provided by the UE 210. In case that information on the EAS running in this stage is unable to be identified in the ECS, the ECS A 220 may identify whether a subscriber of the UE 210 hosting the EEC 210 supports a federation (edge node sharing) service.

In step 2-1, as a result of authentication (identification), in case that federation for the corresponding UE is allowed, the ECS A 220 may transmit, to EESs which the UE 210 is able to access (e.g., EES A 230), a request message to identify whether the EAS (EAS capable of providing service to the corresponding AC) conforming to the AC information provided by the UE 210 is running or instantiation thereof is possible. The instantiable EAS list request message transmitted by the ECS to the EESs may include a UE identifier and AC information and may be transmitted in the form of an existing EAS discovery request message. In step 2-2, the ECS A 220 may receive an instantiable EAS list response message in response to the instantiable EAS list request message from the EESs (e.g., EES A 230) to which the UE 210 is accessible.

In step 3, in case that it is identified in a previous stage that EAS that may be provided to EEC 210 is not running and instantiation thereof is not possible, the ECS A 220 may transmit an EDN configuration information request message to a federation partner ECS B 240 in order to perform federation. The EDN configuration information request message may include at least one of a UE identifier, an EEC ID, UE location information, a provider identifier of the ECS A 220, or AC information. For reference, a provider of ECS or EES may be a mobile communication network operator or an operator that supplies only edge computing service solutions (e.g., a cloud service provider). This information may be identified through the provider identifier of the ECS.

In step 4, the ECS B 240 may find an EDN in which an EAS conforming to UE information and AC information, which has been received from the ECS A 220, is running or instantiation thereof is possible. For example, the ECS B 240 may obtain EAS list information from EES B 250 hosted in an EDN accessible from the location of the UE and identify the EAS list information. When requesting the EAS list information, the ECS B 240 may provide the UE identifier, UE HPLMN ID, the provider identifier of the ECS A 220, and the like to the EES B 250, and may be provided with information that is allowable to the corresponding UE and ECS A 220 provider. This operation may be performed for a plurality of EESs registered in the ECS B 240.

In step 5, the ECS B 240 may provide, based on the information collected in a previous operation, EDN configuration information enabling provision of service to the corresponding UE (e.g., the information may include an EES identifier, an EES address, a DNN, a S-NSSAI, and/or a data network access identifier (DNAI)) to the ECS A 220. In case that the EDN configuration information is unable to be shared with ECS A 220, the ECS B 240 may transmit an indicator indicating that the EDN configuration information is unsharable or redirection request indicator to the ECS A 220 instead of providing the EDN configuration information to the ECS A 220.

In step 6, the ECS A 220 may compare the DNN and S-NSSAI information in the EDN configuration information provided from the ECS B 240 with the DNN and S-NSSAI information used conventionally by the UE 210. In the case of receiving, from the ECS B 240, information different from information configured conventionally in the UE or the DNN and S-NSSAI in the EDN configuration information stored in the ECS A 220, the ECS A 220 may determine that a new PDU session for federation needs to be newly generated. The ECS A 220 may determine that the UE needs to be configured with DNN and S-NSSAI configuration information necessary for generating a new PDU session.

In step 7, in case that it is determined that new DNN and S-NSSAI information should be configured for the UE, the ECS A220 may transmit an application function guidance to UE routing selection policy determination request (AF guidance to URSP determination request) message to a network exposure function of a core network 260 of a PLMN (e.g., a home PLMN of a UE subscriber) to which the UE 210 is currently accessing. Information in the corresponding message may be configured by:

- a UE identifier,
- an AC identifier (e.g., AC ID of EEC, AC IDs of ACs in a UE),
- a spatial validity configured as an EDN service area provided by a partner ECS (e.g., ECS B),
- an EDN DNN/S-NSSAI received from the ECS B that is used as a routing selection descriptor (RSD) constituting a URSP (used to select a PDU session conforming to the corresponding DNN/S-NSSAI when generating or mapping a PDU session through the URSP), and/or
- in case that there has been AF guidance to URSP conventionally issued from the ECS A, the precedence that is configured higher than that of the URSP.

In step 8, the ECS A 220 may receive the AF guidance to the URSP determination response message from the network function of the core network 260. The corresponding message may include successful reception of the request and whether the URSP generation is possible.

In step 9, the network function of the core network 260 may transmit the generated URSP to a UE at the request of the ECS A 220.

In step 10, the network function of the core network 260 may provide the ECS A 220 with a result message about successful URSP reception and completion of URSP configuration application of the UE.

In step 11, when it is identified that the URSP has been successfully configured and applied for the UE, the ECS A 220 may perform AF traffic influence.

In step 12, the ECS A 220 may transmit EDN configuration information received from the ECS B 240 in a previous operation to the UE/EEC 210 by including the EDN configuration information in a service provisioning response message.

Figure 3:
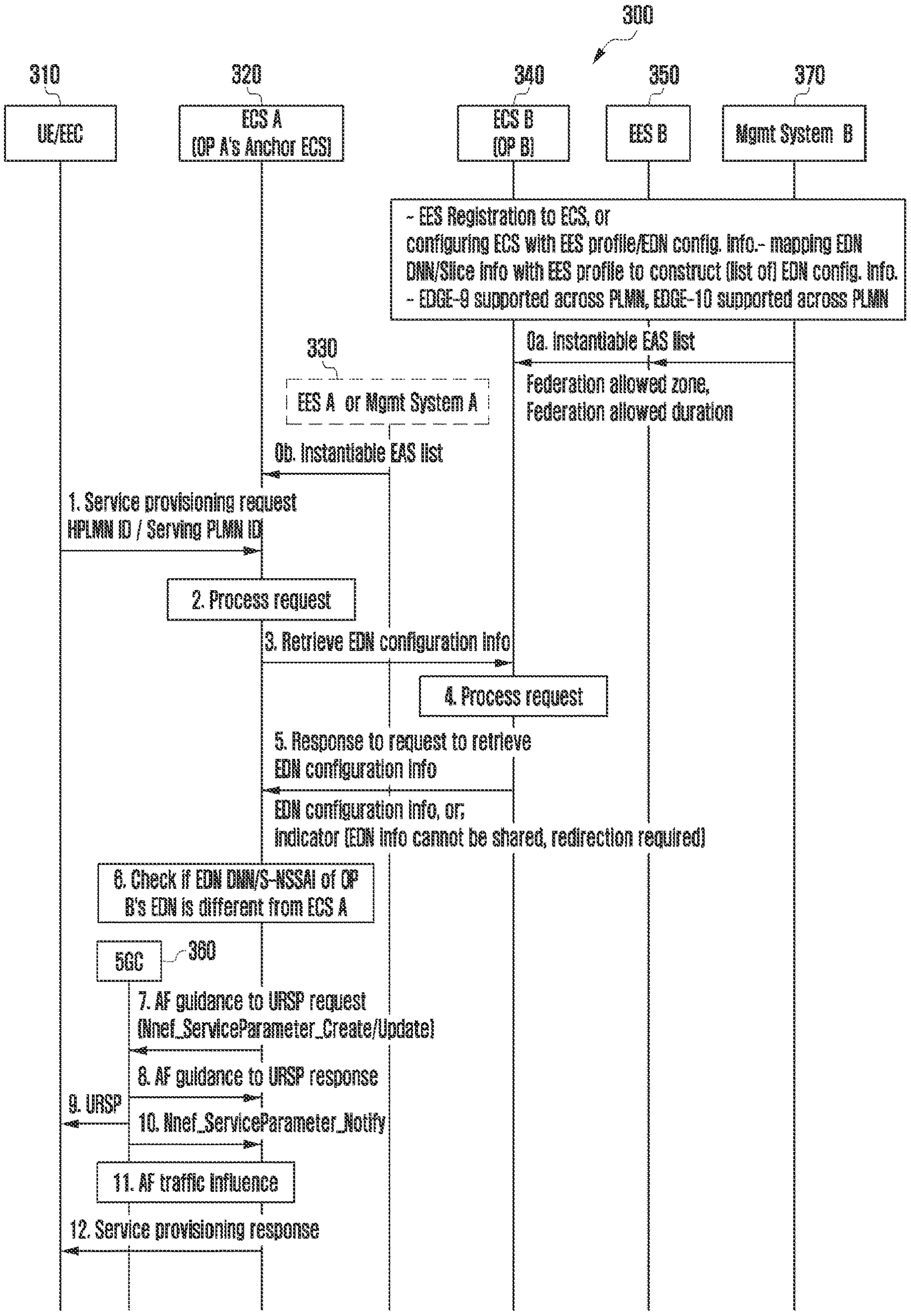
FIG. 3 illustrates an example of a signaling flow for providing edge data network configuration information through federation according to an embodiment.

FIG. 3 illustrates an example of a signaling flow 300 for providing edge data network configuration information through federation according to an embodiment.

Hereinafter, the signaling flow will be described in detail with reference to FIG. 3.

In step 0*a* or 0*b*, an ECS may receive information on instantiable EAS list and federation (or edge node sharing) information from EES server(s) or an edge management system (EMS) (Note: these EES servers and EMS are directly operated by a network operator, or may be supplied and operated by an edge computing service provider contracted with a network operator). For example, an ECS B 340 may receive instantiable EAS information and federation (or edge node sharing) information from an EES B 350 or EMS B 370 (i.e., management system B) according to an edge application demand. Information that is receivable by the ECS from the EES or EMS may include the following pieces of information.

Instantiable EAS information: an EAS identifier and address information enabling instantiation in the edge hosting environment or infrastructure of a network operator or an edge computing service provider contracted with the network operator (in the case of EAS before instantiation, a FQDN or URI value, instead of IP address information, may be configured as address information), edge computing service provider (ECSP) identifier information (an identifier value for a provider that supplies an edge hosting environment in which the EAS is instantiable may have an identifier value indicating a network operator or a third-party edge computing service provider), information on an EDN in which instantiation is possible or network slice information (a combination value of DNN and S-NSSAI), information on a location in which instantiation is possible (the latitude and longitude value as geographical location information, or a tracking area ID, a cell ID, a PLMN ID, or a data network access identifier value as a 3GPP network-related location information value).

Federation (or edge node sharing) information: information on whether federation (or edge node sharing) is allowed, federation allowed zone, federation allowed duration, an indicator indicating whether subscribers of other service providers are allowed to access and use edge computing services for a specific EAS, EES, or EDN, allowed zone (e.g., latitude and longitude, or a tracking area ID, a cell ID, a PLMN ID, DNAI, etc.), and allowed duration (a time stamp value or schedule value).

Information on whether inter-PLMN (or inter-ECSP) EDGE-9 (EES-to-EES interface) is supported: information on whether an EDGE-9 interface for a specific EES is supported even for other PLMN or edge computing service provider domains. For example, information about whether access and provision of services to the EES is allowed outside of the edge hosting environment of the edge computing service provider or PLMN in which the EES is currently installed. Whether the EDGE-9 is supported may be supported only for a specific network operator or edge computing service provider, and an EDGE-9 interface allowance target including specific network operator or edge computing service provider information (e.g., ECSP identifier information or PLMN ID information) may be restricted. For example, an ECS B 340 may obtain an identifier of edge computing service provider A from the EES B 350 or EMS B 370.

Information on whether inter-PLMN (or inter-ECSP) EDGE-10 is supported:information on whether an EDGE-10 interface for a specific ECS is supported even for other PLMN or edge computing service provider domains. For example, information about whether access and provision of services to the ECS is allowed outside of the edge hosting environment of the edge computing service provider or PLMN in which the ECS is currently installed. The edge computing service provider information or specific network operator information may be provided together, in which case federation (or edge node sharing) is allowed only for the corresponding provider/operator.

In step 1, a UE/EEC 310 may transmit a service provisioning request message to an ECS A 320. For example, the ECS A 320 may be an anchor ECS of a network operator A. For example, the corresponding message may include at least one of a UE identifier, an EEC identifier, UE location information, a HPLMN ID, a serving PLMN ID, and AC information (e.g., an AC identifier, an EAS identifier, EAS (FQDN), etc.).

In step 2, the ECS A 320 may determine whether to perform federation by considering the UE identifier, AC information, and the like included in the received service provisioning request message.

The ECS A 320 may determine to perform federation in case that there is no EAS which is running or is capable of performing instantiation in an edge hosting environment of a PLMN network operator accessed by the UE 310 or an edge computing service provider contracted directly with the PLMN network operator.

Specifically, the ECS A 320 may identify information on the currently running EAS by comparing an EAS ID list in an EES profile provided from the EES(s) accessible from the current location of the UE 310 with the AC information provided by the UE 310. In case that the information on the EAS running in this stage is unable to be identified in the ECS, the ECS A 320 may identify whether a subscriber of the UE 310 hosting the EEC supports a federation (edge node sharing) service. As a result of authentication, in case that federation for the corresponding UE is allowed, the ECS A 320 may identify whether an EAS capable of providing service to the corresponding AC conforming to the AC information, which is provided by the UE 310 to the EESs accessible by the UE 310, is running or instantiation thereof is possible, based on the instantiable EAS list information provided by the EES A or EMS A 330 in step Ob, and may identify whether the EAS accessible by the UE 310 is enabled to be instantiated.

In step 3, in case that it is identified in a previous operation that the EAS that may be provided to EEC is not running and instantiation thereof is not possible, the ECS A 320 may transmit an EDN configuration information request message to a federation partner ECS B 340 in order to perform federation. For example, the corresponding message may include a UE identifier, an EEC ID, UE location information, and/or AC information.

In step 4, the ECS B 340 may find an EDN in which an EAS conforming to the UE 310 information and AC information, which has received from the ECS A 320, is running or instantiation thereof is possible. For example, the ECS B 340 may obtain EAS list information from an EES hosted in an EDN accessible from the location of the UE 310 and identify the EAS list information. When requesting the EAS list information, the ECS B 340 may provide the UE identifier, UE HPLMN ID, a provider identifier of the ECS A 320, and the like to the EES, and may be provided with information that is allowable to the corresponding UE 310 and ECS A 320 provider. This operation may be performed for a plurality of EESs registered in the ECS B 340.

In step 5, the ECS B 340 may transmit a response message for the request to the ECS A 320. The ECS B 340 may provide, based on the information collected in a previous operation, EDN configuration information enabling provision of service to the corresponding UE (e.g., the information may include an EES identifier, an EES address, a DNN, S-NSSAI, and/or DNAI) to the ECS A 320. In case that the EDN configuration information is unable to be shared with ECS A 320, the ECS B 340 may transmit an indicator indicating that the EDN configuration information is unsharable or redirection request indicator to the ECS A 320 instead of providing the EDN configuration information to the ECS A 320.

In step 6, the ECS A 320 may compare the DNN and S-NSSAI information in the EDN configuration information provided from the ECS B 340 with the DNN and S-NSSAI information used conventionally by the UE 310. In the case of receiving, from the ECS B 340, information different from information configured conventionally in the UE 310 or the DNN and S-NSSAI in the EDN configuration information stored in the ECS A 320, the ECS A 320 may determine that a new PDU session for federation needs to be newly generated. The ECS A 320 may determine that the UE 310 needs to be configured with DNN and S-NSSAI configuration information necessary for generating a new PDU session.

In step 7, in case that it is determined that new DNN and S-NSSAI information should be configured for the UE 310, the ECS A 320 may transmit an application function guidance to UE routing selection policy determination request (AF guidance to URSP determination request) message to a network exposure function of the core network 360 of the PLMN (e.g., a home PLMN of a UE subscriber) to which the UE 310 is currently accessing. Information in the corresponding message may be configured by:

- a UE identifier,
- an AC identifier (e.g., AC ID of the EEC, or AC IDs of ACs in a UE),
- a spatial validity configured as an EDN service area provided by a partner ECS (e.g., ECS B),
- an EDN DNN/S-NSSAI received from the ECS B is that used as an RSD, and/or
- in case that there has been the AF guidance to URSP issued from the existing ECS A, the precedence that is configured higher than that of the URSP.

In step 8, the ECS A 320 may receive an AF guidance to URSP determination response message from the network function of the core network 360. The corresponding message may include successful reception of the request and whether the URSP generation is possible.

In step 9, the network function of the core network 360 may transmit the generated URSP to the UE 310 at the request of the ECS A 320.

In step 10, the network function of the core network 360 may provide the ECS A 320 with a result message about successful URSP reception and completion of URSP configuration application of the UE 310.

In step 11, when it is identified that the URSP has been successfully configured and applied for the UE 310, the ECS A 320 may perform AF traffic influence with the core network 360.

In step 12, the ECS A 320 may transmit EDN configuration information received from the ECS B 340 in a previous stage to the EEC 310 by including the EDN configuration information in a service provisioning response message.

Figure 4:
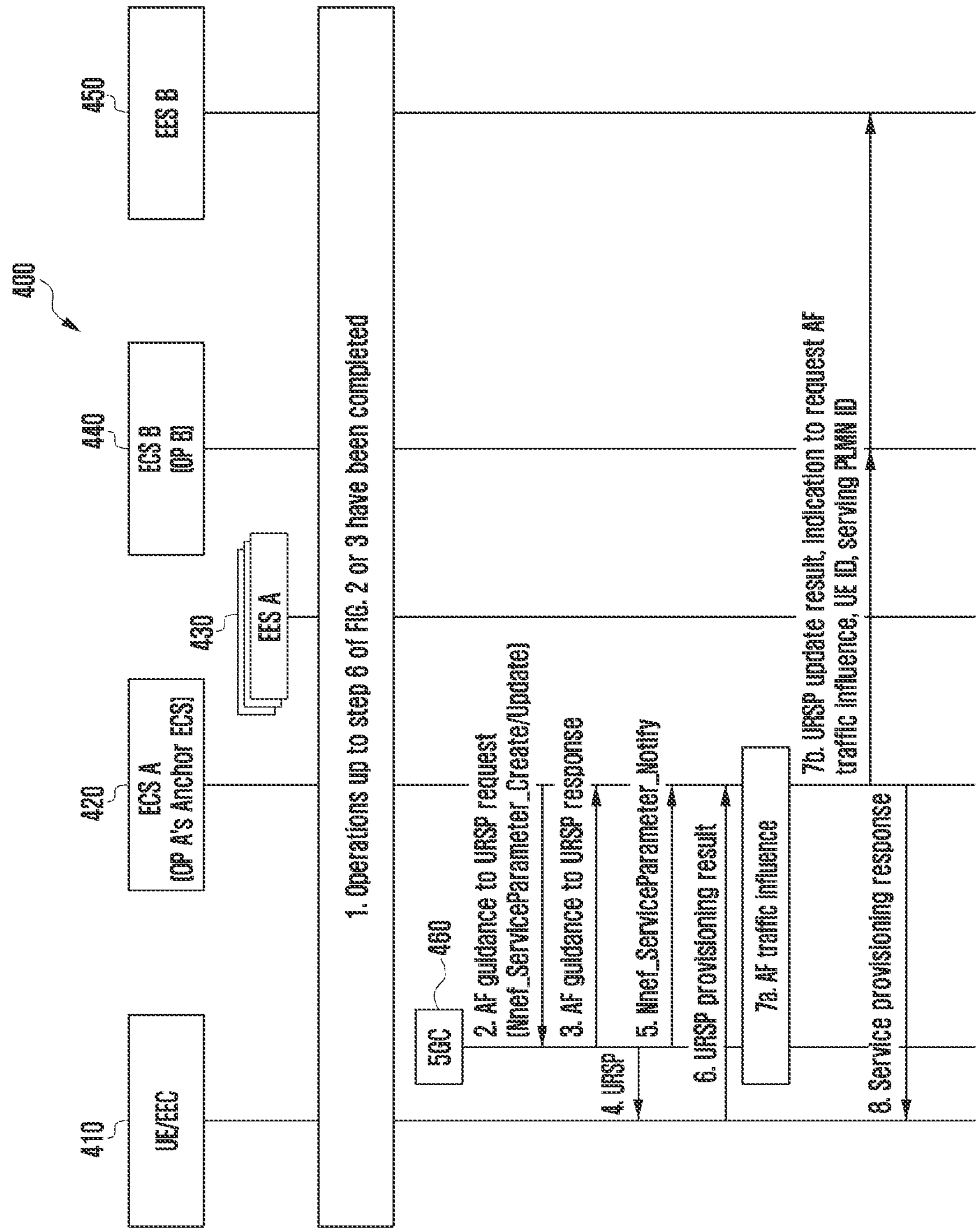
FIG. 4 illustrates an example of a signaling flow for a method for determining whether to configure and apply a URSP generated for federation, and a method for managing a user plane path according to an embodiment.

In FIGS. 2 and 3 described above, the step performed after the ECS A 320 acquires the EDN configuration information enabling federation from the partner ECS B 340 may be modified and performed as shown in FIG. 4.

FIG. 4 illustrates an example of a signaling flow 400 for a method for determining whether to configure and apply a URSP generated for federation, and a method for managing a user plane path according to an embodiment.

In step 1, it is assumed that steps 1-6 of FIG. 2 or FIG. 3 have been completed.

In step 2, in case that it is determined that new DNN and S-NSSAI information should be configured for the UE 410, the ECS A 420 may transmit an application function guidance to UE routing selection policy determination request (AF guidance to URSP determination request) message to a network exposure function of a core network 460 of a PLMN (e.g., a home PLMN of a UE subscriber) to which the UE 410 is currently accessing. Information in the corresponding message may be configured by:

- a UE identifier,
- an AC identifier (e.g., AC ID of the EEC or AC IDs of ACs in a UE),
- a spatial validity configured as an EDN service area provided by a partner ECS (e.g., ECS B),
- an EDN DNN/S-NSSAI received from the ECS B that is used as an RSD, and/or
- in case that there has been the AF guidance to URSP issued conventionally from the ECS A, the precedence that is configured higher than that of the URSP.

In step 3, the ECS A 420 may receive the AF guidance to URSP determination response message from the network function of the core network 460. The corresponding message may include successful reception of the request and whether the URSP generation is possible.

In step 4, the network function of the core network 460 may transmit the generated URSP to a UE/EEC at the request of the ECS A 420. The UE/EEC 410 may identify whether the successful configuration and application of the URSP, having been obtained from the core network 460, are possible. For example, based on the reception of a URSP for updating a method for mapping between traffic generated by a conventionally used application client or EEC and a PDU session, the UE/EEC 410 may identify that the application of URSP is successful. The subject performing this identification operation may correspond to a modem, EEC, or AC in a UE, or functions in the OS, and when the successful application of URSP is identified in any device in the UE, the EEC 410 should be notified of the identification.

In step 5, the network function of the core network 460 may provide the ECS A 420 with a result message about successful reception of URSP and completion of application of URSP configuration of the UE 410.

In step 6, the UE/EEC 410 may transmit a message indicating whether the configuration/application of URSP is successful, having been received in step 4, to the ECS. The corresponding message may include information included in the applied URSP and an indicator indicating whether the application is successful. The information in the URSP may include at least one of information on an application to be applied (e.g., AC identifier, FQDN) or a DNN used as a traffic descriptor (a DNN that has been preconfigured and used in AC), and an S-NSSAI or a DNN used as an RSD. In addition, in case that a plurality of URSP configurations/applications are performed for a plurality of ACs, an indicator indicating whether the application of URSP is successful may indicate whether the URSP configuration/application is successful for each AC in the UE 410.

In step 7*a*, the ECS A 420 may perform AF traffic influence with the core network 460 after receiving the message indicating whether configuration/application of URSP is successful from both the core network 460 and the EEC 410. In step 7*b*, the ECS A 420 may notify the ECS B 440 that the URSP has been successfully configured/applied, and may transmit an indicator to request performing of AF traffic influence, a target UE identifier, and a serving PLMN ID of the UE 410 to the ECS B 440. The ECS B 440 may transfer the information received from the ECS A 420 in step 7*b* to the EES B 450.

In step 8, the ECS A 420 may include the EDN configuration information received from the ECS B 440 in a previous step in a service provisioning response message and transmit the same to the UE/EEC 410.

Signals/information transmitted and received between ECS A and ECS B in FIGS. 2 to 4 may be transferred through an EDGE-10 interface between ECS A and ECS B.

Figure 5:
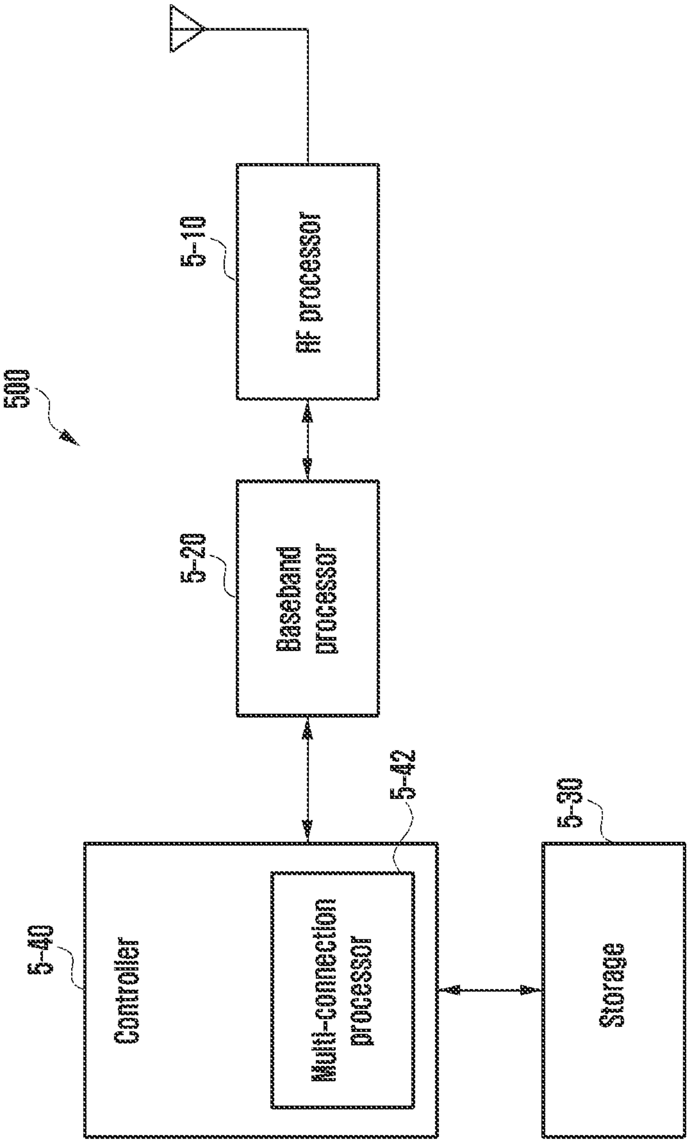
FIG. 5 is a block diagram illustrating an internal structure of a UE according to an embodiment.
Figure 6:
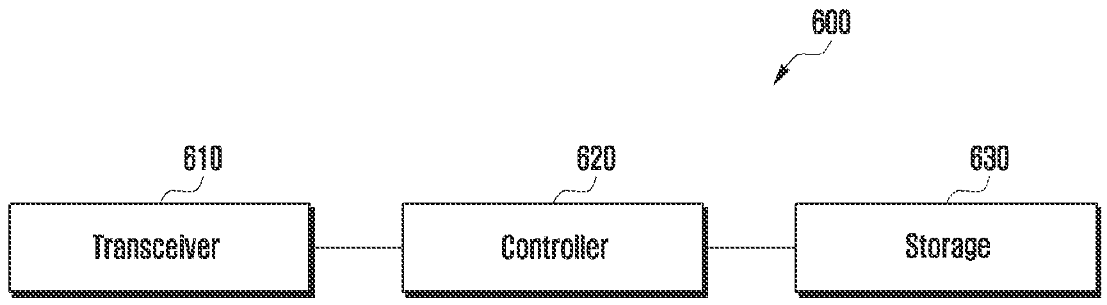
FIG. 6 illustrates a structure of a network entity for performing a network function according to an embodiment.

The methods and/or embodiments of the disclosure may be performed by a UE of FIG. 5 and a network entity of FIG. 6.

FIG. 5 is a block diagram illustrating an internal structure of a UE 500 according to an embodiment.

Referring to FIG. 5, the UE 500 may include a radio frequency (RF) processor 5-10, a baseband processor 5-20, a storage 5-30, and a controller 5-40. The disclosure is not limited to the above example, and the UE 500 may include fewer than or additional elements to those shown in FIG. 5. The UE 500 may include a AC and EEC as described herein.

The RF processor 5-10 may be configured to perform a function of transmitting and receiving a signal through a wireless channel, such as band conversion and amplification of a signal. That is, the RF processor 5-10 may be configured to up-convert a baseband signal provided from a baseband processor 5-20 to an RF band signal to thus transmit the same through an antenna and down-convert an RF band signal received through the antenna to a baseband signal. For example, the RF processor 5-10 may include a transmission filter, a reception filter, an amplifier, a mixer, an oscillator, a digital-to-analog converter (DAC), an analog-to-digital converter (ADC), and the like. The UE 500 may have a plurality of antennas and the RF processor 5-10 may include a plurality of RF chains. The RF processor 5-10 may perform beamforming. That is, the RF processor 5-10 may be configured to adjust the phases and magnitudes of signals transmitted and received through a plurality of antennas or antenna elements. In addition, the RF processor 5-10 may perform MIMO and may receive multiple layers when performing the MIMO operation.

The baseband processor 5-20 may perform a function of conversion between a baseband signal and a bit string according to the physical layer specification of the system. For data transmission, the baseband processor 5-20 encodes and modulates transmission bit strings, thereby generating complex symbols. For data reception, the baseband processor 5-20 may demodulate and decode a baseband signal provided from the RF processor 5-10 to thus recover reception bit strings. That is, when an orthogonal frequency division multiplexing (OFDM) scheme is applied, in the case of data transmission, the baseband processor 5-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In the case of data reception, the baseband processor 5-20 may divide the baseband signal provided from the RF processor 5-10 into OFDM symbol units, recover the signals mapped to the subcarriers through a fast Fourier transform (FFT) operation, and then recover reception bit strings through demodulation and decoding.

The baseband processor 5-20 and the RF processor 5-10 may be referred to as a transmitter, a receiver, a transceiver, or a communication unit. At least one of the baseband processor 5-20 and the RF processor 5-10 may include a plurality of communication modules to support a plurality of different wireless access technologies and different communication modules for processing signals of different frequency bands. For example, the different wireless access technologies may include a wireless local area network (LAN) and a cellular network. The different frequency bands may include super high frequency (SHF) (e.g., 2.NRHz or NRhz) band and a millimeter wave (e.g., 50 GHz) band. The UE 500 may transmit and receive signals to and from a base station by using the baseband processor 5-20 and the RF processor 5-10, and the signal may include control information and data.

The storage 5-30 stores data such as basic programs, application programs, and configuration information for the operation of the UE 500. In particular, the storage 5-30 may store information related to a second access node that performs wireless communication using a second wireless access technology and may provide stored data in response to a request from the controller 5-40. The storage 5-30 may include a storage medium such as a read only memory (ROM), a random access memory (RAM), a hard disk, a CD-ROM, and a digital versatile disc (DVD), or a combination of storage media. In addition, the storage 5-30 may include a plurality of memories.

The controller 5-40 controls the overall operation of the UE 500. For example, the controller 5-40 may control signal flow between blocks to perform an operation according to the flowchart described above, and may be configured to transmit a service provisioning request message to an ECS and receive a service provisioning response message from the ECS through the baseband processor 5-20 and the RF processor 5-10. In addition, the controller 5-40 records and reads data in and from the storage 5-30. To this end, the controller 5-40 may include at least one processor. For example, the controller 5-40 may include a communication processor (CP) for performing control for communication and an application processor (AP) for controlling a higher layer such as an application program. At least one element in the UE 500 may be implemented as a single chip.

FIG. 6 illustrates a structure of a network entity 600 for performing a network function according to an embodiment. For example, the network entity of FIG. 6 may be a node of a network. For example, the network entity of FIG. 6 may correspond to one of EEC, ECS, EES, EAS, EMS or EDN described above through the embodiments of the disclosure.

Referring to FIG. 6, a network entity for performing a network function may include a transceiver 610, a controller 620, and a storage 630. The controller 620 may be defined as a circuit, an application-specific integrated circuit, or at least one processor.

The transceiver 610 may transmit/receive signals to/from other network entities. The transceiver 610 may transmit/receive signals or messages to/from, for example, an access and mobility management function (AMF)), which is a network entity that manages access and mobility of a UE to an access network.

The controller 620 may control the overall operation of a network entity that performs network functions according to the embodiments proposed in the disclosure. For example, the controller 620 may control signal flow between blocks to perform the operations describe herein and may be configured to transmit a request message for requesting information associated with an EDN to a partner ECS and receive a response message including the information associated with the EDN. The controller 620 may be configured to receive an EES profile from the EES.

The storage 630 may store at least one of information transmitted/received through the transceiver 610 and information generated through the controller 620.

The embodiments described above and the drawings are merely specific examples that have been presented to easily explain the technical contents of the disclosure, and are not intended to limit the scope of the disclosure. That is, it will be apparent to those skilled in the art that other variants based on the technical scope of the disclosure may be implemented. Furthermore, the above respective embodiments may be employed in combination, as necessary. For example, all the embodiments of the disclosure may be partially combined to operate a base station and a UE.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a first edge configuration server (ECS) for an edge computing service, the method comprising:

receiving, from an edge enabler server (EES) associated with the first ECS, an EES profile including instantiable edge application server (EAS) information;

determining a second ECS for the edge computing service based on the received EES profile;

transmitting, to the second ECS for the edge computing service, a request message for requesting information associated with an edge data network (EDN), wherein the request message includes information on a location of a terminal and information on an application client, and wherein the information on the application client comprises at least one of an identifier of the application client or an identifier of an EAS; and receiving, from the second ECS, a response message including the information associated with the EDN.

2. The method of claim 1, wherein the information associated with the EDN includes at least one of an identifier of an EES associated with the second ECS, an address of the EES associated with the second ECS, a data network name (DNN), single network slice selection assistance information (S-NSSAI), or a data network access identifier (DNAI).

3. The method of claim 1, wherein the request message and the response message are transferred via an edge-10 interface.

4. A method performed by a second edge configuration server (ECS) for an edge computing service, the method comprising:

receiving, from an edge enabler server (EES) associated with the second ECS, instantiable edge application server (EAS) information;

receiving, from a first ECS for the second edge computing service, a request message for requesting information associated with an edge data network (EDN), wherein the request message includes information on a location of a terminal and information on an application client, and wherein the information on the application client comprises at least one of an identifier of the application client or an identifier of an EAS; and transmitting, to the first ECS, a response message including the information associated with the EDN.

5. The method of claim 4, wherein the information associated with the EDN includes at least one of an identifier of the EES associated with the second ECS, an address of the EES associated with the second ECS, a data network name (DNN), single network slice selection assistance information (S-NSSAI), or a data network access identifier (DNAI).

6. A first configuration server (ECS) for an edge computing service, the first ECS comprising:

a transceiver; and a controller coupled with the transceiver and configured to:

receive, from an edge enabler server (EES) associated with the first ECS, an EES profile including instantiable edge application server (EAS) information, determine a second ECS for the edge computing service based on the received EES profile, transmit, to the second ECS for the edge computing service, a request message for requesting information associated with an edge data network (EDN), wherein the request message includes information on a location of a terminal and information on an application client, and wherein the information on the application client comprise at least one of an identifier of the application client or an identifier of an EAS, and receive, from the second ECS, a response message including the information associated with the EDN.

7. The first ECS of claim 6, wherein the information associated with the EDN includes at least one of an identifier of an EES associated with the second ECS, an address of the EES associated with the second ECS, a data network name (DNN), single network slice selection assistance information (S-NSSAI), or a data network access identifier (DNAI).

8. A second edge configuration server (ECS) for an edge computing service provider in an edge computing system, the ECS comprising:

a transceiver; and a controller coupled with the transceiver and configured to:

receive, from an edge enabler server (EES) associated with the second ECS, instantiable edge application server (EAS) information, receive, from a first ECS for the edge computing service, a request message for requesting information associated with an edge data network (EDN), wherein the request message includes information on a location of a terminal and information on an application client, and wherein the information on the application client comprises at least one of an identifier of the application client or an identifier of an EAS, and transmit, to the first ECS, a response message including the information associated with the EDN.

9. The second ECS of claim 8, wherein the information associated with the EDN includes at least one of an identifier of an EES associated with the second ECS, an address of the EES associated with the second ECS, a data network name (DNN), single network slice selection assistance information (S-NSSAI), or a data network access identifier (DNAI), and wherein the request message and the response message are transferred via an edge-10 interface.

10. The method of claim 4, further comprising:

identifying the EDN to provide the edge computing service based on the request message.

11. The second ECS of claim 8, wherein the controller is further configured to:

identify the EDN to provide the edge computing service based on the request message.

* * * * *